United States Patent
Morgan

[15] 3,645,266
[45] Feb. 29, 1972

[54] APPARATUS FOR REMOVING FOREIGN BODIES FROM THE CORNEA OF THE EYE

[72] Inventor: Loran B. Morgan, 127 West 21st Ave., Torrington, Wyo. 82240

[22] Filed: Dec. 29, 1969

[21] Appl. No.: 888,526

[52] U.S. Cl. ...................................................128/305
[51] Int. Cl. ........................................................A61b 17/32
[58] Field of Search..................................128/305; 351/160

[56] References Cited

UNITED STATES PATENTS 3,507,566  4/1970  Knapp ..................................351/160

FOREIGN PATENTS OR APPLICATIONS 946,877  12/1947  France...................................351/160

Primary Examiner—Channing L. Pace
Attorney—Clarence A. O'Brien and Harvey B. Jacobson

[57] ABSTRACT

Foreign bodies are removed from the cornea of the eye by natural corneal movement relative to a special contact lens placed in contact therewith. The eye is anesthetized before the contact lens is applied. The lens is provided with one or more openings in its central portion contacting the corneal epithelium so as to form cutting edges along which the epithelium embedding the foreign bodies, is dissected.

4 Claims, 6 Drawing Figures

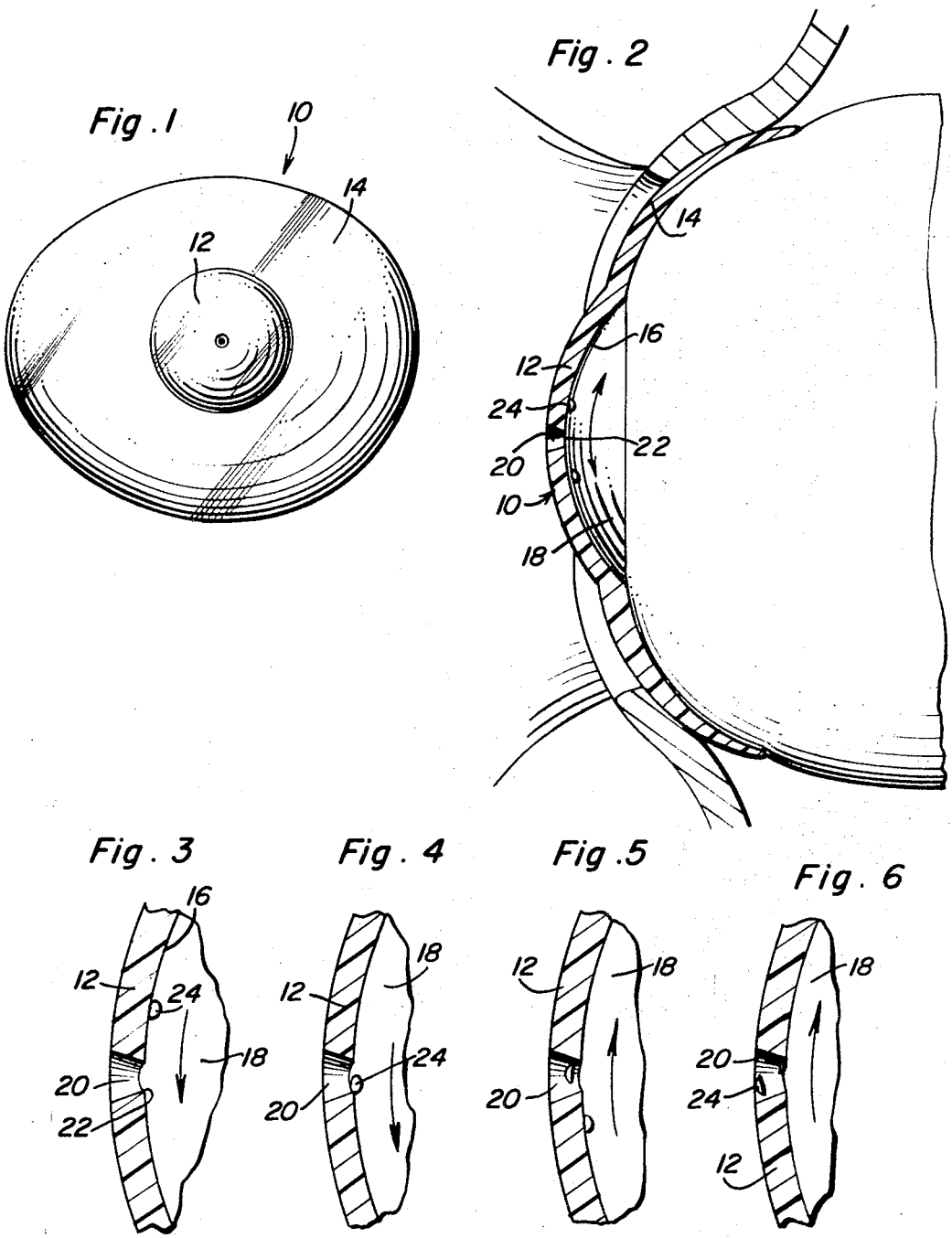

APPARATUS FOR REMOVING FOREIGN BODIES FROM THE CORNEA OF THE EYE

This invention relates to the removal of foreign bodies embedded in the cornea of the eye.

The present treatment for removing foreign bodies embedded in the cornea of the eye, involves dissecting a portion of the corneal epithelium embedding the foreign body by use of a sharp needle knife. This treatment obviously requires a considerable amount of skill and the exercise of extreme care on the part of the physician. Nevertheless, existing treatment causes considerable damage to the cornea which fortunately heals very readily.

It is therefore an important object of the present invention to facilitate removal of foreign bodies embedded in the cornea of the eye by dissecting a portion of the corneal epithelium embedding the foreign body with a minimum amount of damage to the cornea and without requiring the exacting skill and care presently exercised.

In accordance with the present invention, a topical anesthetic and an antibiotic agent are applied to the eye as initial steps in the treatment. After the eye is anesthetized, a special contact lens is placed on the cornea and the patient is instructed to blink a few times. The contact lens is provided with one or more openings which form cutting edges located in the central portion of the lens so as to dissect portions of the corneal epithelium in response to the movement of the cornea relative to the lens. As a result of this action, the foreign bodies will be dissected off the cornea with a small portion of its epithelium which is expelled through the openings in the lens.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a front elevational view of the special contact lens utilized in accordance with the present invention.

FIG. 2 is a side sectional view of the contact lens applied to a human eye.

FIGS. 3 through 6 are partial sectional views illustrating the foreign body removal action associated with the present invention.

Referring now to the drawings in detail, FIGS. 1 and 2 illustrate a special contact lens like element generally referred to by reference numeral 10 which includes a central corneal portion 12 and a scleral flange portion 14 as in the case of most corrective contact lenses. However, in accordance with the present invention, the central portion 12 of the lens is provided with an inside surface 16 conforming to the curvature of the cornea 18 as shown in FIG. 2 so as to contact the corneal epithelium, or the outer, nonvascular layer of the cornea. Further, in accordance with the present invention, the lens is provided with at least one opening 20 in its central portion thereby forming an inner cutting edge 22.

As shown in the drawings, the cutting edge is formed by the intersection of the conical passage of opening 20 converging toward the inside contact surface of the element 10. Thus, an effective cutting edge 22 will be formed by the sides of the passage at an acute angle to the inside contact surface.

The contact lens 10 is utilized as part of a treatment for removing foreign bodies that become embedded in the corneal epithelium such as the foreign bodies 24 shown in FIG. 2. However, before the lens is fitted over the cornea, a drop of a topical anesthetic is placed on the eye. This is followed by a drop of a suitable antibiotic agent. Another drop of topical anesthetic is then applied. When the eye has become fully anesthetized, the contact lens is placed on the cornea and the patient is instructed to blink a few times. The lens is then removed and the cornea reexamined. In most cases, the foreign bodies will have been removed with very little damage to the epithelium.

The foreign body removal action is shown in FIGS. 3 through 6. These figures of the drawing illustrate the relative movement between the cornea 18 and the central portion 12 of the lens with which the corneal epithelium is in contact. It will be observed therefore, that the epithelium of the cornea is dissected along the cutting edge 22 of the opening 20 so that any foreign body 24 will also be dissected therewith as a result of the relative movement between the cornea and the lens. Several back-and-forth movements of the cornea will therefore progressively dissect the foreign body 24 off the cornea with the dissected portions of the epithelium being expelled through the opening 20. It will be apparent that the size of the opening 20 must be large enough to present a cutting edge 22 of sufficient linear length to effect dissection as well as to form a passage large enough to permit expulsion of dissected material.

The foregoing is considered as illustrative only of the principles of the invention. Further, since numerous modifications and changes will readily occur to those skilled in the art, it is not desired to limit the invention to the exact construction and operation shown and described, and accordingly all suitably modifications and equivalents may be resorted to, falling within the scope of the invention as claimed.

What is claimed is:

1. A device adapted to be placed in contact with the eyeball for removal of foreign bodies from the corneal epithelium, comprising a lenslike element including a corneal portion conforming to the curvature of the cornea and a scleral flange portion for retaining the element on the eyeball, said corneal portion having a contact surface and a conical opening converging toward the contact surface to form a cutting edge of effective linear dimension and to permit expulsion of matter dissected from the epithelium by relative movement between the cutting edge and the eyeball.

2. A lenslike element for use in removing a foreign body embedded in the corneal epithelium of the eye by causing relative movement between the eyeball and the element in contact therewith, said element including a corneal contact portion conforming to the curvature of the cornea, and means formed in the corneal contact portion for dissecting and expelling dissected epithelium in which the foreign body is embedded in response to said relative movement between the eyeball and the element.

3. The device as defined in claim 2 wherein said dissecting and expelling means comprises a circular cutting edge formed by an opening in the corneal contact portion.

4. The device as defined in claim 3 wherein the corneal contact portion has an inside contact surface intersected by the opening forming a conical passage permitting discharge of said dissected epithelium.

* * * * *